(12) United States Patent
Kang (10) Patent No.: US 8,520,116 B2
(45) Date of Patent: Aug. 27, 2013

(54) PHOTOGRAPHING APPARATUS AND METHOD

(75) Inventor: Tae-hoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 12/831,422

(22) Filed: Jul. 7, 2010

(65) Prior Publication Data

US 2011/0007177 A1   Jan. 13, 2011

(30) Foreign Application Priority Data

Jul. 7, 2009   (KR) ........................ 10-2009-0061722

(51) Int. Cl.
*H04N 5/222* (2006.01)
*H04N 5/228* (2006.01)

(52) U.S. Cl.
USPC .................................. 348/333.02; 348/222.1

(58) Field of Classification Search
USPC ................ 348/222.1, 333.01, 333.02, 333.04
See application file for complete search history.

(56) References Cited

U.S. PATENT DOCUMENTS

| | | | |
|---|---|---|---|
| 6,301,440 B1* | 10/2001 | Bolle et al. | 396/128 |
| 7,570,294 B2* | 8/2009 | Nakamura | 348/333.04 |
| 2004/0239796 A1* | 12/2004 | Imai | 348/362 |
| 2009/0073285 A1* | 3/2009 | Terashima | 348/231.99 |
| 2010/0259645 A1* | 10/2010 | Kaplan et al. | 348/231.99 |

* cited by examiner

*Primary Examiner* — Kelly L Jerabek
(74) *Attorney, Agent, or Firm* — Drinker Biddle & Reath LLP (57) ABSTRACT

A photographing apparatus includes an imaging device that converts light of an image into an electrical signal, an image conversion unit that converts the electrical signal into image data, a scene recognition unit that recognizes the type of a scene to be photographed by analyzing the image data, a display unit that displays scene information regarding the recognized scene, a user input unit that receives user input, and a condition setting unit that locks a shooting condition as a shooting mode corresponding to the recognized type of the scene for photographing, according to the user input received via the user input unit.

14 Claims, 9 Drawing Sheets

PERFORM IMAGE PROCESSING IMMEDIATELY AFTER
LANDSCAPE MODE IS RECOGNIZED

PHOTOGRAPHING APPARATUS AND METHOD

CROSS-REFERENCE TO RELATED PATENT APPLICATION

This application claims the priority benefit of Korean Patent Application No. 10-2009-0061722, filed on Jul. 7, 2009, in the Korean Intellectual Property Office, the disclosure of which is incorporated herein in its entirety by reference.

BACKGROUND

1. Field of the Invention

Embodiments relate to a photographing apparatus and method, and more particularly, to a photographing apparatus and method, in which the type of a scene that is to be photographed may be automatically recognized to set a shooting condition suitable for the recognized type of the scene and photographing may be performed by locking the shooting condition according to a user's selection.

2. Description of the Related Art

Recently, cameras having a 'shooting mode' function have come into widespread use. The shooting mode provides, for example, a portrait mode, a landscape mode, or a night-view mode, which is an automatically set shooting condition according to the environment of a scene that is to be photographed. In general, a shooting mode is selected by manipulating a mode dial. However, beginners who are inexperienced in handling cameras may have difficulty determining a mode that matches the current state of a scene that is to be photographed.

To solve this problem, a scene recognition function has been introduced, by which a current shooting state of a desired scene is analyzed. Via the scene recognition function, a shooting mode for photographing the scene is automatically determined, a shooting condition of a camera is automatically set according to the determined shooting mode, and then photographing is performed.

The scene recognition function would be very useful for beginners but may inconvenience users who desire to photograph a scene according to a particular shooting mode. That is, when the scene recognition function is used, scene recognition is continuously performed even after the type of a scene has been automatically recognized and the particular shooting mode has been selected. Thus, a shooting mode change occurs when the scene changes even slightly.

Also, since scene recognition is continuously performed even after the type of a scene has been automatically recognized and a particular shooting mode has been selected, an algorithm for scene recognition is repeatedly executed, and thus load on a camera is increased, thereby reducing the operating speed of the camera.

SUMMARY

Embodiments provide a photographing apparatus and method, in which the type of a scene that is to be photographed may be automatically recognized to set a shooting condition that matches the type of scene recognized and photographing may be performed by locking the shooting condition according to a user's selection.

Embodiments also provide a photographing apparatus and method, in which a user may be recommended a shooting mode that matches a change in the type of a scene when the scene is to be photographed according to a shooting condition that matches the original type of the scene when the shooting condition has been locked in.

According to an embodiment, a photographing apparatus includes an imaging device that converts light of an image into an electrical signal; an image conversion unit that converts the electrical signal into image data; a scene recognition unit that recognizes the type of a scene to be photographed by analyzing the image data; a display unit that displays scene information regarding the recognized scene; a user input unit that receives user input; and a condition setting unit that locks a shooting condition as a shooting mode corresponding to the recognized type of the scene for photographing, according to the user input received via the user input unit.

The photographing apparatus may further include a shooting controller that controls the imaging device to capture the image according to the locked shooting condition.

The photographing apparatus may further include an image processing unit that processes the image data generated by the image conversion unit according to the locked shooting condition and under control of the shooting controller.

The photographing apparatus may further include a storage unit that stores the image data processed by the image processing unit.

The display unit may display the recognized type of the scene in the form of text.

The display unit may display the recognized type of the scene in the form of an icon.

The display unit may display a preview image generated by the imaging device according to the locked shooting condition corresponding to the type of the scene recognized by the scene recognition unit.

The photographing apparatus may further include a mode recommendation unit that displays a recommended mode that respectively matches the type of the scene recognized by the scene recognition unit on the display unit, after the condition setting unit locks the shooting condition.

According to another embodiment, a photographing method includes capturing a preview image by converting an electrical signal received from an imaging device into image data; recognizing the type of a scene to be photographed by analyzing the image data; displaying scene information regarding the recognized type of the scene on a display unit; locking a shooting condition, wherein the imaging device captures images according to the shooting condition, according to user input; and performing photographing to obtain image data by operating the imaging device according to the locked shooting condition.

The photographing method may further include processing the image data obtained by the performing of the photographing according to the locked shooting condition.

The displaying of the scene information may include displaying the preview image and the scene information on the display unit, and the photographing method may further include processing the preview image according to the locked shooting condition.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments of a photographing apparatus and method will be described in detail with reference to the accompanying drawings.

Figure 1:
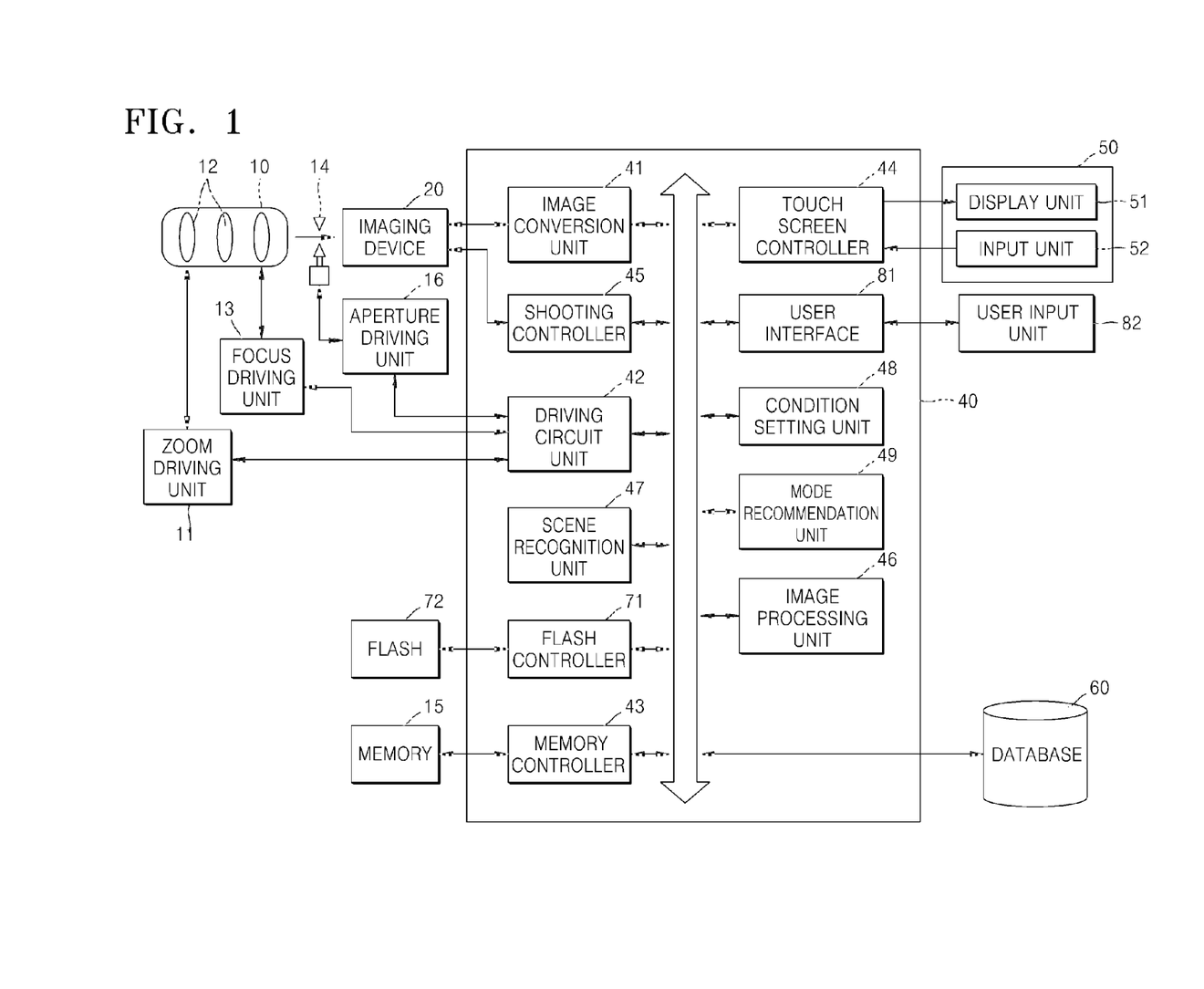
FIG. 1 is a block diagram schematically illustrating a photographing apparatus according to an embodiment.

FIG. 1 is a block diagram schematically illustrating a photographing apparatus according to an embodiment. Referring to FIG. 1, the photographing apparatus includes an imaging device 20, an image conversion unit 41, a scene recognition unit 47, a condition setting unit 48, a display unit 51, and a user input unit 82. The imaging device 20 captures an image of a subject to be photographed and converts light of the image into an electrical signal. The image conversion unit 41 receives and converts the electrical signal into image data. The scene recognition unit 47 recognizes the type of a scene to be photographed. The display unit 51 displays scene information regarding the recognized type of the scene. The user input unit 82 receives user input. The condition setting unit 48 sets a shooting condition.

The photographing apparatus of FIG. 1 may perform a preview function of displaying a real time preview image of the subject by processing the image captured by the imaging device 20 and then displaying the preview image on the display unit 51, or may perform a photographing operation of processing the captured image and storing the processing result in a memory 15.

An optical system 10 that is disposed in front of the imaging device 20 includes a plurality of lenses 12 and an aperture 14, and focuses external image light onto a surface of the imaging device 20. The lenses 12 are arranged such that the distances between the lenses 12 may be changed. Zoom magnification and focus of the optical system 10 may be adjusted by changing the distances between the lenses 12.

When the plurality of lenses 12 are driven by either a zoom driving unit 11 having a driving unit, such as a zoom motor, or a focus driving unit 13, the distances between the lenses 12 may be changed within the optical system 10. The plurality of lenses 12 may include a zoom lens that increases or decreases the size of an image of a subject and a focus lens that adjusts the focus of an image of the subject. The zoom driving unit 11 and the focus driving unit 13 operate when a driving circuit unit 42 of a controller 40 respectively supplies control signals to the zoom driving unit 11 and the focus driving unit 13. Thus, the zoom driving unit 11 may drive the optical system 10 such that the optical system 10 has one of a plurality of magnification factors. Also, the focus driving unit 13 may drive the optical system 10 such that the optical system 10 adjusts the focus of an image of the subject. The aperture 14 is a device that controls the amount of light that may be incident on the imaging device 20, and is driven by an aperture driving unit 16.

The imaging device 20 includes a photoelectric conversion device, such as a charge coupled device (CCD) or a complementary metal oxide semiconductor (CMOS), and converts image light incident thereon via the optical system 10 into an electrical signal. A process of converting the image light into the electrical signal may include converting the image light into an analog signal, converting the analog signal into a digital signal, and performing signal processing, e.g., pixel defect correction, gain correction, white balance correction, or gamma correction, on the digital signal.

The image conversion unit 41 converts the electrical signal into image data that may be image processed. The image data generated by the image conversion unit 41 may be stored in the memory 15, and may be used by the scene recognition unit 47 or an image processing unit 46.

In order to generate image data by capturing image light of a subject, the imaging device 20 may operate largely in two ways. That is, the imaging device 20 may operate to generate a highest-resolution image when a user manipulates a shutter button to photograph the subject, or may operate to generate a preview image to be displayed on the display unit 51 before the user manipulates the shutter button.

In general, the resolution of the display unit 51 is lower than the highest resolution that the photographing apparatus can capture and record. Thus, the imaging device 20 generates an image having a resolution that is lower than the highest resolution that the photographing apparatus can capture and record as a preview image.

While the photographing apparatus performs the preview function, images of the subject are repeatedly captured at predetermined intervals and processed in order to be displayed on the display unit 51 in real time to generate an electrical signal.

The controller 40 is electrically connected to the imaging device 20, the zoom driving unit 11, the focus driving unit 13, the aperture driving unit 16, a flash 72, the memory 15, and a touch screen 50 in order to exchange a control signal with them for controlling the operations thereof or in order to process data. The controller 40 includes the image conversion unit 41, the driving circuit unit 42, a touch screen controller 44, a memory controller 43 that manages data to be stored in the memory 15, a shooting controller 45, the condition setting unit 48, the scene recognition unit 47, a mode recommendation unit 49, the image processing unit 46, a flash controller 71, and a user interface 81

The controller 40 may be embodied as a microchip or a printed circuit board having a microchip, and elements of the controller 40 may be embodied using software or circuits installed in the controller 40.

The memory controller 43 manages image data to be written to the memory 15 or manages image data or setting information to be read from the memory 15. The memory 15 may be, for example, a semiconductor memory device, such as synchronous dynamic random access memory (SDRAM) that is capable of storing data of an image captured.

The flash controller 71 outputs a control signal for driving the flash 72, wherein the flash 72 is a light emitting device.

The flash 72 emits a predetermined amount of light toward the subject for a predetermined duration according to a command given from the flash controller 71.

The photographing apparatus may include the display unit 51, which displays an image corresponding to image data, and the touch screen 50 having an input unit 52 for selecting a part of the image displayed on the display unit 51. The touch screen 50 may display an image captured by the imaging device 20. When a surface of the touch screen 50 is touched, the touch screen 50 may sense the touch and may generate a signal corresponding to a location of the touch.

The touch screen 50 is an input device that may replace a keyboard and a mouse. A user may perform a desired operation by touching a surface of the display unit 51 of the touch screen 50 directly with a hand or with a pen, thereby the operation may be intuitively performed in a graphic user interface (GUI)-based environment. The display unit 51 of the touch screen 50 may be a liquid crystal display (LCD) or an organic light emitting diode (OLED) display.

The input unit 52 may be installed on the display unit 51 to sense touching of a surface of the display unit 51, and is an example of a user input unit included in the photographing apparatus according to the current embodiment. The input unit 52 may be embodied in various forms, e.g., a resistive sense unit, a capacitive sense unit, a surface acoustic wave-based sense unit, an infrared-ray (IR)-based sense unit, or an optical sense unit.

A user may either select an option displayed on the display unit 51 to execute a desired operation or designate a part of displayed images via touching the input unit 52 of the touch screen 50.

Referring to FIG. 1, the photographing apparatus includes the user input unit 82, which is installed separately from the touch screen 50 to receive user input. The user input unit 82 may be embodied in various forms. For example, the user input unit 82 may be embodied in the form of a menu button or a dial. Otherwise, the user input unit 82 may be a speech recognition device that recognizes a user's speech, e.g., "lock" and "cancel".

If the imaging device 20 captures an image of a subject and generates an electrical signal and the image conversion unit 41 converts the electrical signal into image data, then the image processing unit 46 processes the image data in order to generate a preview image to be displayed on the display unit 51 or in order to generate data to be stored in the memory 15.

The scene recognition unit 47 analyzes the image data to recognize the type of a scene to be photographed. The display unit 51 may display scene information regarding the recognized type of the scene.

The scene recognition unit 47 may recognize the type of the scene in various ways. For example, the scene recognition unit 47 may recognize the type of the scene by setting an object region in the image represented by the image data, wherein the object region corresponds to a target subject to be photographed, and determining the type of the object region according to predetermined conditions. If the object region corresponds to a person, a portrait mode may be set as the shooting condition. If the object region corresponds to a flower, a close-up shooting mode may be set as the shooting condition. If the object region corresponds to a mountain, a field, or a river, then a landscape mode may be set as the shooting condition. If the object region corresponds to text, a text mode may be set as the shooting condition.

The scene recognition unit 47 may recognize the type of the scene based on object recognition that uses geometrical characteristics, color information, or edge information of objects stored in a database 60. In the object recognition, the type of a subject that is to be photographed is recognized based on geometrical information, e.g., the locations and sizes of the minutiae of an object (a flower, a face, a mountain, etc.) and the distances between the minutiae; edge information; or color information of an object, such as, the sky or a sea, which has unique colors.

The user input unit 82 receives user input and generates a signal according to the user input. The controller 40 may determine from the user input received via the user interface 81 whether a user intends to perform photographing while the shooting condition is locked in a mode matching the type of the scene recognized by the scene recognition unit 47.

If it is determined from the user input received via the user input unit 82 that the user intends to lock the shooting condition as the mode matching the currently recognized type of the scene, the condition setting unit 48 locks the shooting condition. Then, photographing is performed according to the locked shooting condition after the locking operation of the condition setting unit 48.

The mode recommendation unit 49 may recommend to a user a shooting mode that matches a change in the type of a scene to be photographed even after the condition setting unit 48 has locked the shooting condition as a specific shooting mode. Even after the condition setting unit 48 has locked the shooting condition, the scene recognition unit 47 may continuously analyze image data obtained by capturing images. If the type of a scene that does not match the currently locked shooting condition is recognized, the mode recommendation unit 49 may control information regarding the recognized type of the scene to be displayed on the display unit 51 in order to recommend a new shooting mode to the user.

The shooting controller 45 controls the imaging device 20 to capture images according to the shooting condition locked by the condition setting unit 48. When a user manipulates a shutter button (not shown), the shooting controller 45 may generate a photographing signal for controlling the imaging device 20 to capture images. The shooting controller 45 may also control the imaging device 20 to capture images even when the user does not manipulate the shutter button. For example, the shooting controller 45 may control the imaging device 20 to start capturing images when a preview image received from the imaging device 20 matches a current shooting mode or may control the imaging device 20 to automatically capture images according to the current shooting mode when a preview image that matches the current shooting mode has been constantly maintained for several seconds, e.g., for three or five seconds.

The image processing unit 46 may process image data generated by the image conversion unit 41 according to the shooting condition. Then the image data may be displayed on the display unit 51 or stored in the memory 15. The image processing unit 46 may process image data of a preview image according to the shooting condition locked by the condition setting unit 48 so that the preview image may be displayed on the display unit 51.

Also, the image processing unit 46 may not only process a preview image according to the current shooting condition but may also process image data obtained by performing a photographing operation so that the processing result may be displayed on the display unit 51 or stored in the processing result in the memory 15.

Figure 2:
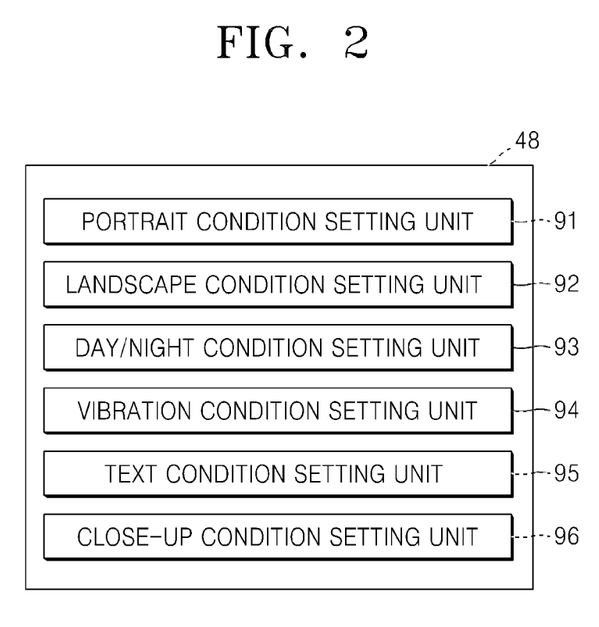
FIG. 2 is a block diagram schematically illustrating a condition setting unit included in the photographing apparatus of FIG. 1, according to an embodiment.

FIG. 2 is a block diagram schematically illustrating the condition setting unit 48 of FIG. 1 according to an embodiment. The condition setting unit 48 may include a portrait condition setting unit 91, a landscape condition setting unit 92, a day/night condition setting unit 93, a vibration condition setting unit 94, a text condition setting unit 95, and a close-up condition setting unit 96 that respectively set conditions for photographing based on the type of a scene recognized by the scene recognition unit 47 of FIG. 1. In detail, the portrait condition setting unit 91 sets a condition for photographing a person. The landscape condition setting unit 92 sets a condition for photographing a landscape. The day/night condition setting unit 93 sets a condition for photographing at day/night time. The vibration condition setting unit 94 sets a condition for compensating for vibration when a scene such as sports activities is photographed. The text condition setting unit 95 sets a condition for photographing text. The close-up condition setting unit 96 sets a condition for close-up photographing of a flower or an insect. The condition setting unit 48 may further include other various functions suitable for various scenes.

With the photographing apparatus as described above with reference to FIGS. 1 and 2, it is possible to perform photographing while locking the shooting condition that matches the type of a scene recognized by the scene recognition unit 47. Thus, it is possible to lessen inconvenience caused by a slight change in the type of a scene to be photographed when photographing is performed using automatic scene recognition. Also, the mode recommendation unit 49 may recommend to a user a shooting mode that matches a change in the type of the scene while photographing is performed according to the locked shooting condition that is set.

Figure 3:
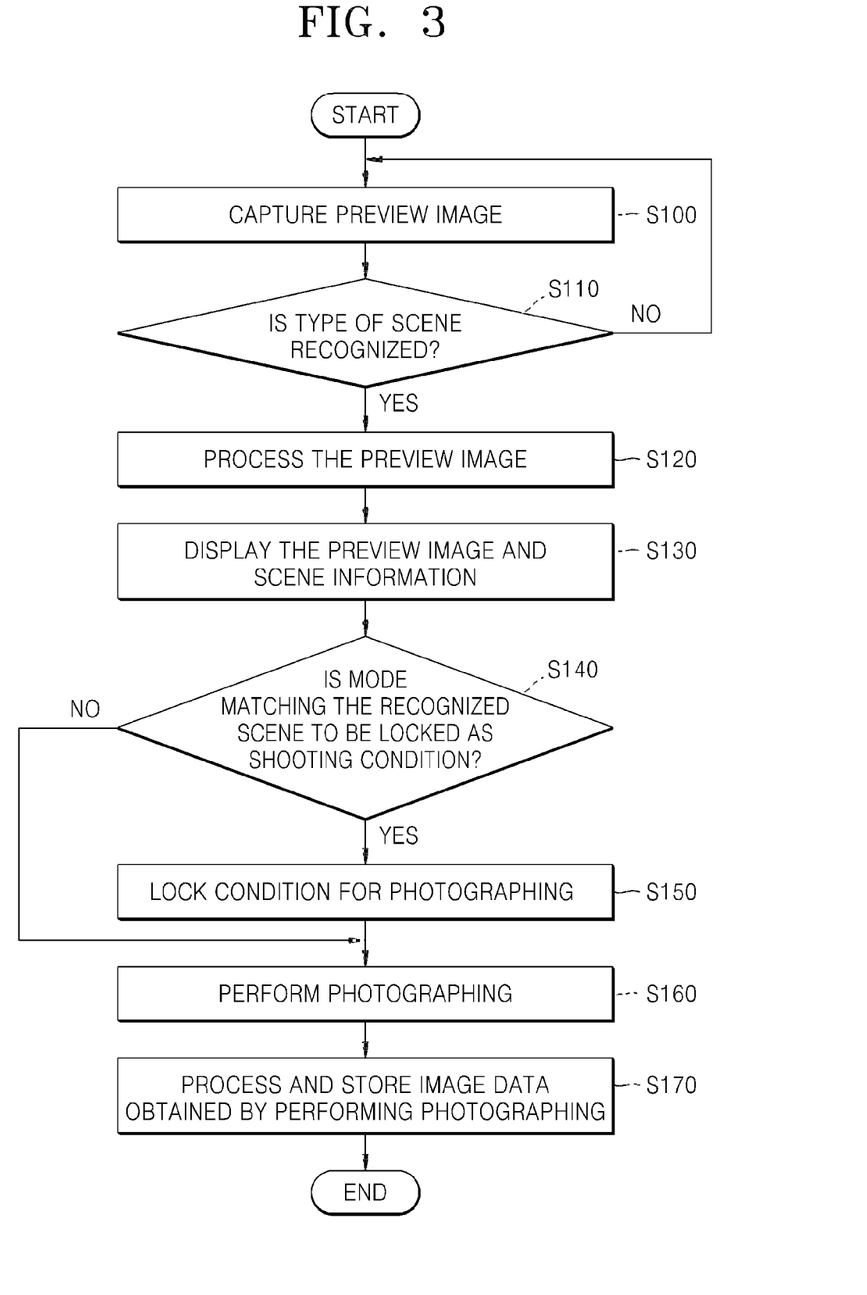
FIG. 3 is a flowchart illustrating a photographing method according to an embodiment.

FIG. 3 is a flowchart illustrating a photographing method according to an embodiment. The photographing method of FIG. 3 includes capturing a preview image by converting an electrical signal received from an imaging device into image data (operation S100), recognizing the type of a scene that is to be photographed from the image data (operation S110), displaying scene information regarding the recognized type of the scene on a display unit (operation S130), locking a shooting condition for photographing (operation S150), and obtaining image data by operating the imaging device (operation S160).

Specifically, in operation S100, the imaging device captures a preview image of a subject, wherein the resolution of the image is fit for the display unit. The imaging device repeatedly captures images of the subject at predetermined intervals of time so that the images may be continuously processed in order to display a real time preview image. Image data used to display the preview image is obtained in operation S100.

In operation S110, the image data captured in operation S110 is analyzed to recognize the type of the scene that is to be photographed.

In operation S110, various methods may be used to recognize the type of the scene. For example, the type of the scene may be recognized by setting an object region, wherein the object region corresponds to a target subject to be photographed, in the image represented by the image data, and determining the type of the object region according to predetermined conditions. If the object region corresponds to a person, a portrait mode may be set as the shooting condition. If the object region corresponds to a flower, a close-up shooting mode may be set as the shooting condition. If the object region corresponds to a mountain, a field, or a river, then a landscape mode may be set as the shooting condition. If the object region corresponds to text, a text mode may be set as the shooting condition.

For example, the type of the scene may be recognized using object recognition that uses geometrical characteristics, color information, or edge information corresponding to objects stored in a database. In the object recognition, the type of a subject that is to be photographed is recognized based on geometrical information, e.g., the locations and sizes the minutiae of an object (a flower, a face, a mountain, etc.) and the distances between the minutiae; edge information; or color information of an object, such as, the sky or a sea, which have unique colors.

When the type of the scene is recognized in operation S110, then the image data is processed according to the type of the scene recognized in order to obtain a preview image (operation S120). Then, the preview image and scene information regarding the type of the scene are displayed on the display unit (operation S130).

Next, a user may check the scene information displayed on the display unit, and determine whether a mode that matches the recognized type of the scene is to be locked as the shooting condition. The user may lock the shooting condition as the matching mode by manipulating a device, such as, a touch screen or a menu button (operation S140). If the user determines to lock the shooting condition as the matching mode by manipulating a user input unit, the shooting condition for photographing performed by the imaging device may be locked (operation S150).

If the shooting condition is locked in operation S150, and then if the user manipulates a shutter, photographing is performed according to the locked shooting condition (operation S160), and image data obtained by performing photographing is processed according to the locked shooting condition and is then stored (operation S170).

According to the photographing method of FIG. 3, photographing may be performed while the shooting condition is locked in a mode matching the type of a scene, which is automatically recognized. Thus, it is possible to prevent the shooting condition from being changed by a slight change in the type of the scene while photographing is performed using automatic scene recognition.

Figure 4:
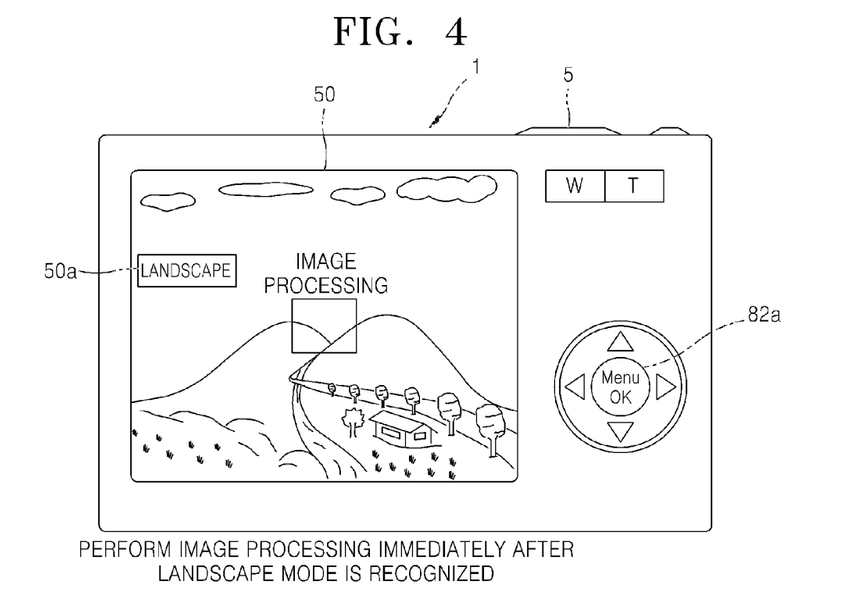
FIG. 4 is a diagram illustrating an operation of the photographing method of FIG. 3, in which a preview image and scene recognition status are displayed, according to an embodiment.

FIG. 4 is a diagram illustrating an operation of the photographing method of FIG. 3, in which a preview image and scene recognition status are displayed, according to an embodiment.

Referring to FIGS. 3 and 4, when operation S100 is performed, a user may set an overall composition for photographing while watching a preview image displayed on a touch screen 50 of a photographing apparatus 1. The user may half press a shutter button 5 to capture a preview image such as the preview image of FIG. 4.

If the shutter button 5 is half pressed, operation S110 may be performed. When the type of a scene is recognized in operation S110, the preview image is processed according to the recognized type of the scene in operation S120, and the preview image and scene information 50*a* regarding the type of the scene is displayed in operation S130.

Referring to FIG. 4, the scene information 50*a* may be displayed on the touch screen 50 in the form of text that describes the type of the scene. Alternatively, the scene information 50*a* may be displayed in the form of an icon.

Figure 5:
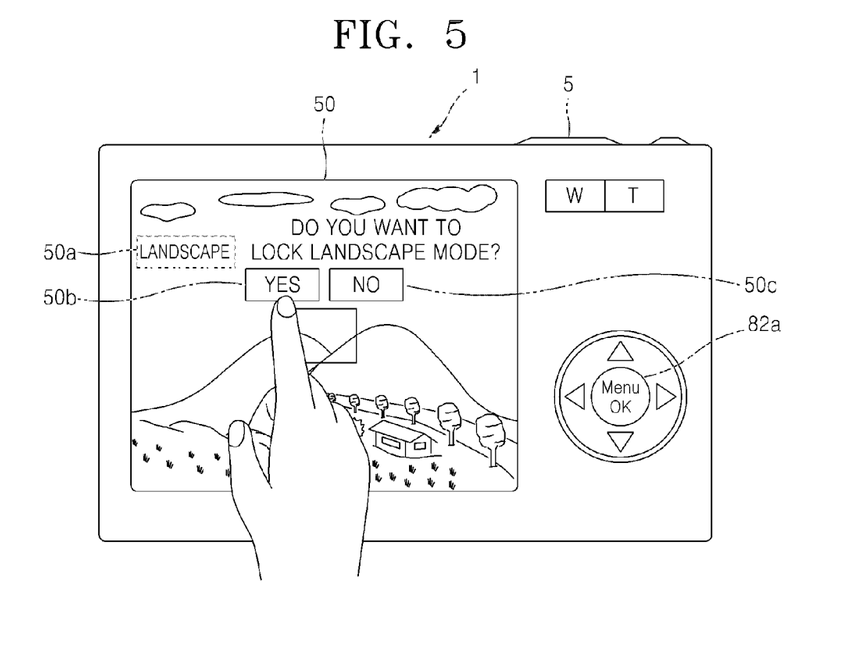
FIG. 5 is a diagram illustrating an operation of the photographing method of FIG. 3, in which a shooting condition is locked after performing the scene recognition of FIG. 4, according to an embodiment.

FIG. 5 is a diagram illustrating an operation of the photographing method of FIG. 3, in which a shooting condition is locked after performing the scene recognition of FIG. 4, according to an embodiment.

Referring to FIGS. 3 and 5, after the type of a scene is recognized and a preview image and scene information are displayed in operation S130 of FIG. 3, icons 50*b* and 50*c* inquiring whether a shooting mode that matches the type of the scene is to be used for photographing are displayed. A user may lock, for example, a landscape mode as the shooting condition of a photographing apparatus 1 by directly manipulating either a touch screen 50 or a menu button 82*a*, in which the menu button 82*a* is a user input unit. Operation S150 may be performed to lock the shooting condition for photographing according to the manipulation result.

Figure 6:
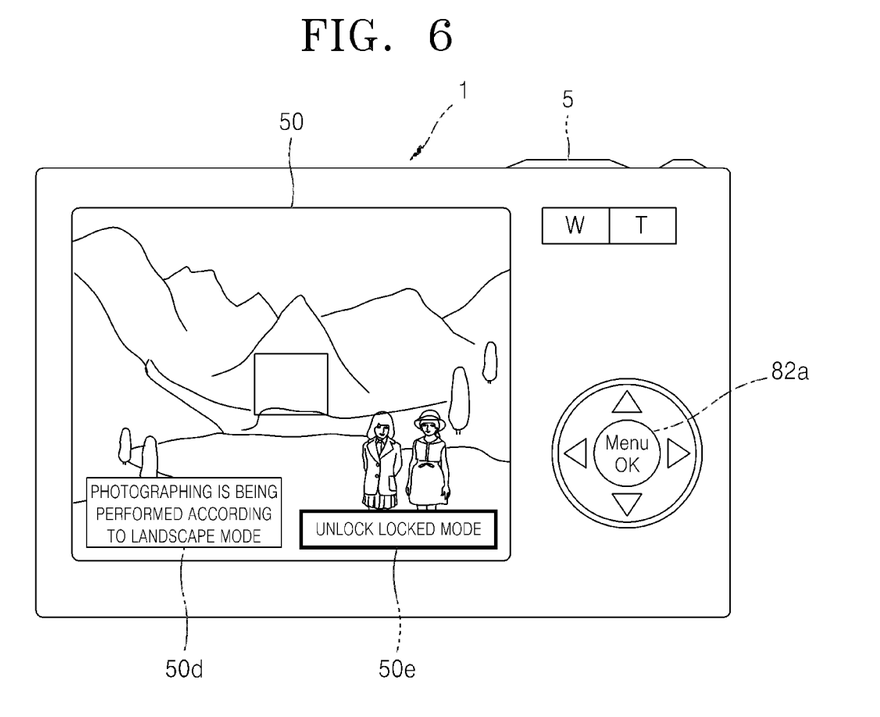
FIG. 6 is a diagram illustrating an operation of the photographing method of FIG. 3, in which photographing is performed after the locking of the shooting condition in FIG. 5, according to an embodiment.

FIG. 6 is a diagram illustrating an operation of the photographing method of FIG. 3, in which photographing is performed after the locking of the shooting condition (operation S150) in FIG. 5, according to an embodiment.

Scene information 50d represents a current shooting mode and is displayed on a touch screen 50 of a photographing apparatus 1. Even if a preview image displayed on the touch screen 50 changes, the photographing apparatus 1 may process and display the preview image according to the shooting condition that is currently locked, and may perform photographing according to the currently locked shooting condition. A user may unlock the locked shooting condition by manipulating either an icon 50e displayed on the touch screen 50 or a menu button 82a. If the user fully presses a shutter button 5, the photographing apparatus 1 performs photographing according to the currently locked shooting condition.

Figure 7:
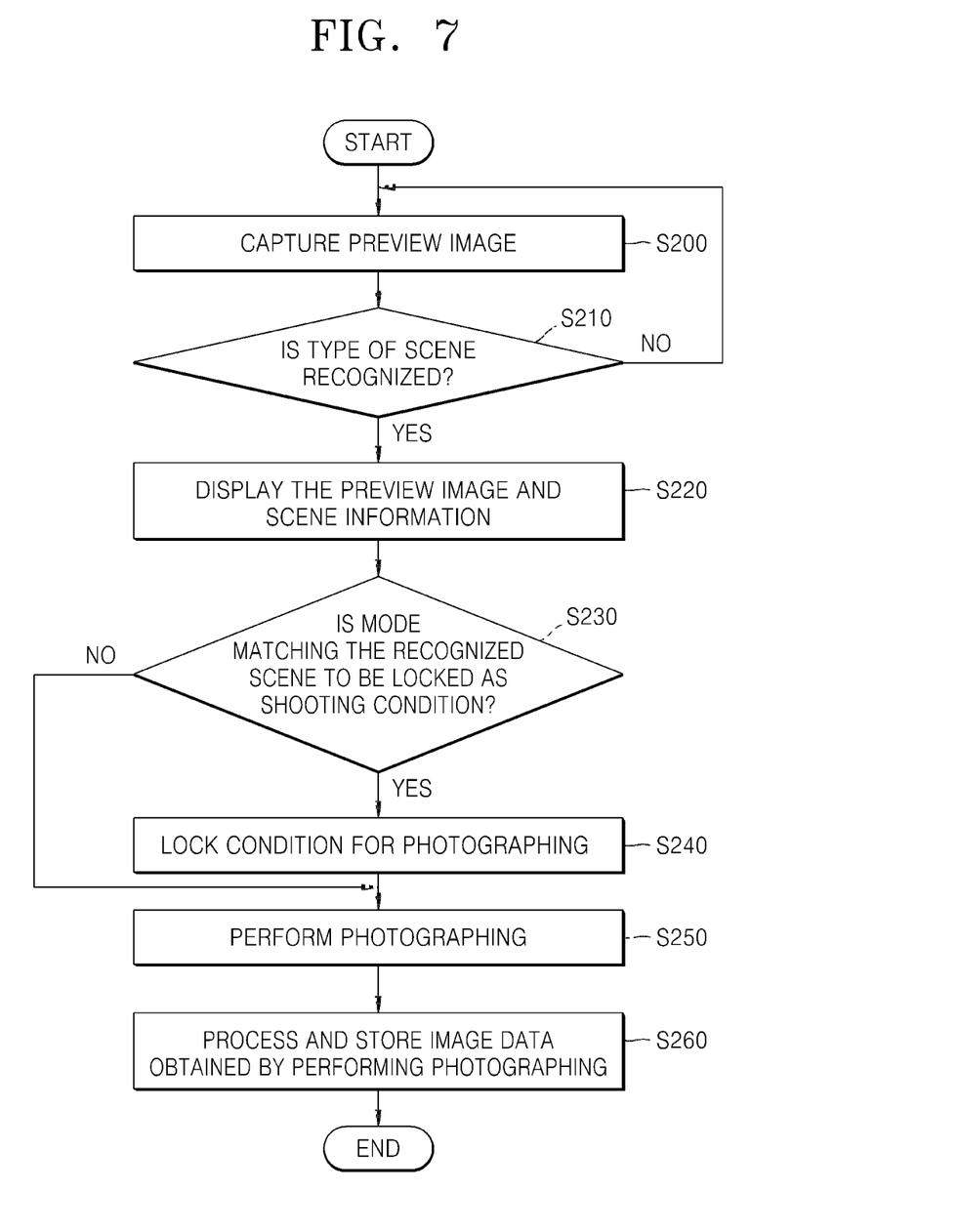
FIG. 7 is a flowchart illustrating a photographing method according to another embodiment.

FIG. 7 is a flowchart illustrating a photographing method according to another embodiment. The photographing method of FIG. 7 includes capturing a preview image by converting an electrical signal received from an imaging device into image data (operation S200), recognizing the type of a scene that is to be photographed from the image data (operation S210), displaying scene information regarding the recognized type of the scene on a display unit (operation S220), determining whether a mode that matches the recognized type of the scene is to be locked as a shooting condition (operation S230), locking the shooting condition for photographing when it is determined in operation S230 that the shooting condition is to be locked as the matching mode (operation S240), and obtaining image data by operating the imaging device (operation S250). After operation S250 is performed, the image data is processed according to the locked shooting condition and is stored (operation S260).

The photographing method of FIG. 7 does not include processing the image according to the type of the scene recognized in operation S210 compared to the photographing method of FIG. 3. Thus, the image that is not processed and the scene information indicating the recognized type of the scene are displayed in operation S220. Accordingly, although a user cannot predetermine from the image the type of photographing to be performed according to a current shooting mode, the user may reduce a time required for image processing and load for data processing.

Figure 8:
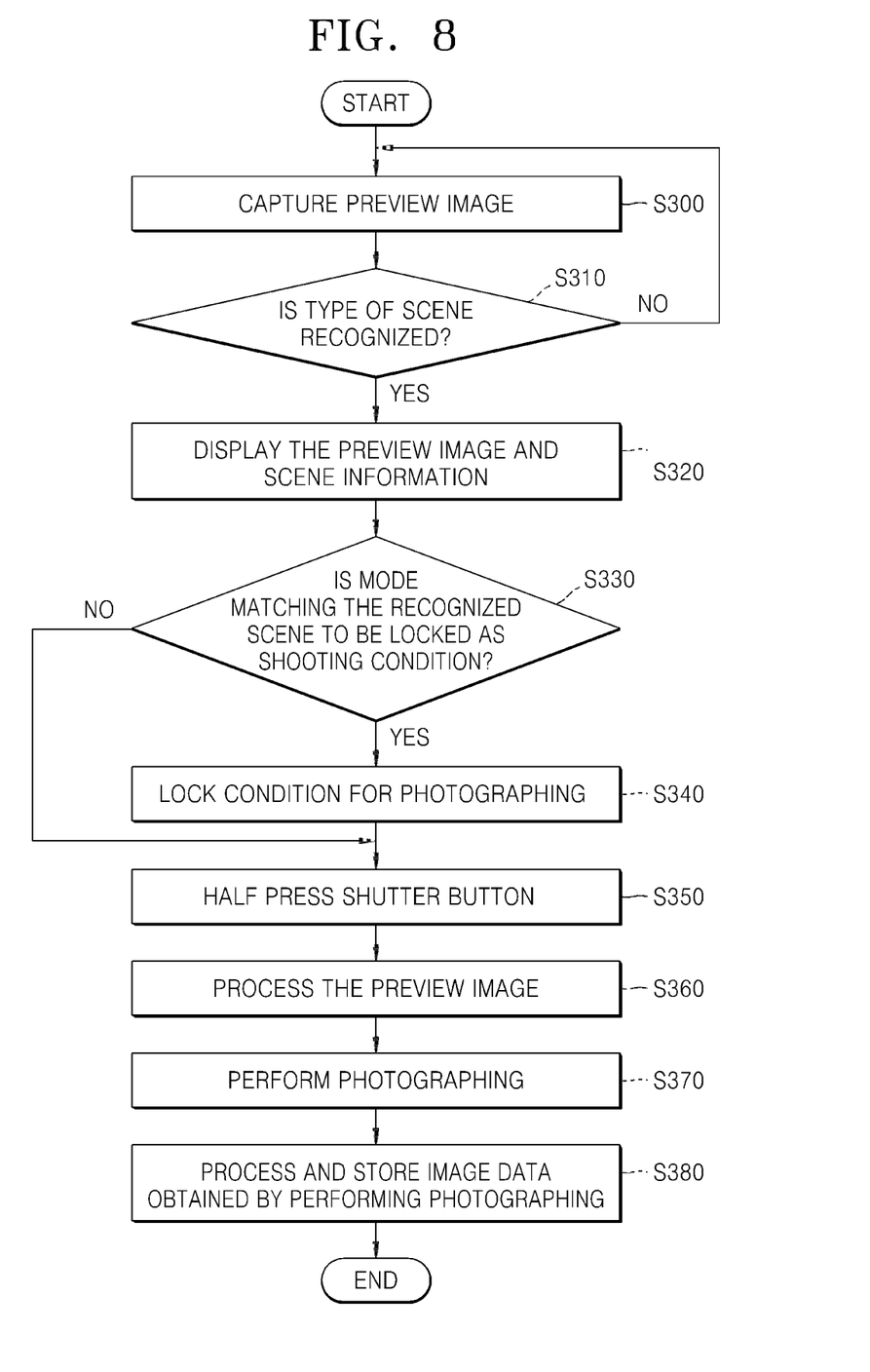
FIG. 8 is a flowchart illustrating a photographing method according to another embodiment.

FIG. 8 is a flowchart illustrating a photographing method according to another embodiment. The photographing method of FIG. 8 includes capturing a preview image by converting an electrical signal received from an imaging device into image data (operation S300), recognizing the type of a scene that is to be photographed from the image data (operation S310), displaying scene information regarding the recognized type of the scene on a display unit (operation S320), determining whether a mode that matches the recognized type of the scene is to be locked as a shooting condition (operation S330), locking the shooting condition for photographing when it is determined in operation S330 that the shooting condition is to be locked as the matching mode (operation S340), processing the preview image according to the recognized type of the scene (operation S360) when a user half presses a shutter button (operation S350), and obtaining image data by operating the imaging device (operation S370). After operation S370 is performed, the image data is processed according to the locked shooting condition and is stored (operation S380).

The photographing method of FIG. 8 does not include processing the preview image according to the recognized type of the scene in operation S310 prior to displaying the preview image and scene information in operation S320 compared to the photographing method of FIG. 3. Thus, the preview image that is not processed and the scene information indicating the recognized type of the scene are displayed in operation S320.

Accordingly, before performing photographing according to a current shooting mode by fully pressing the shutter button, a user may determine the type of photographing based on the preview image, which is processed and displayed according to the recognized type of the scene, by half pressing the shutter button.

Figure 9:
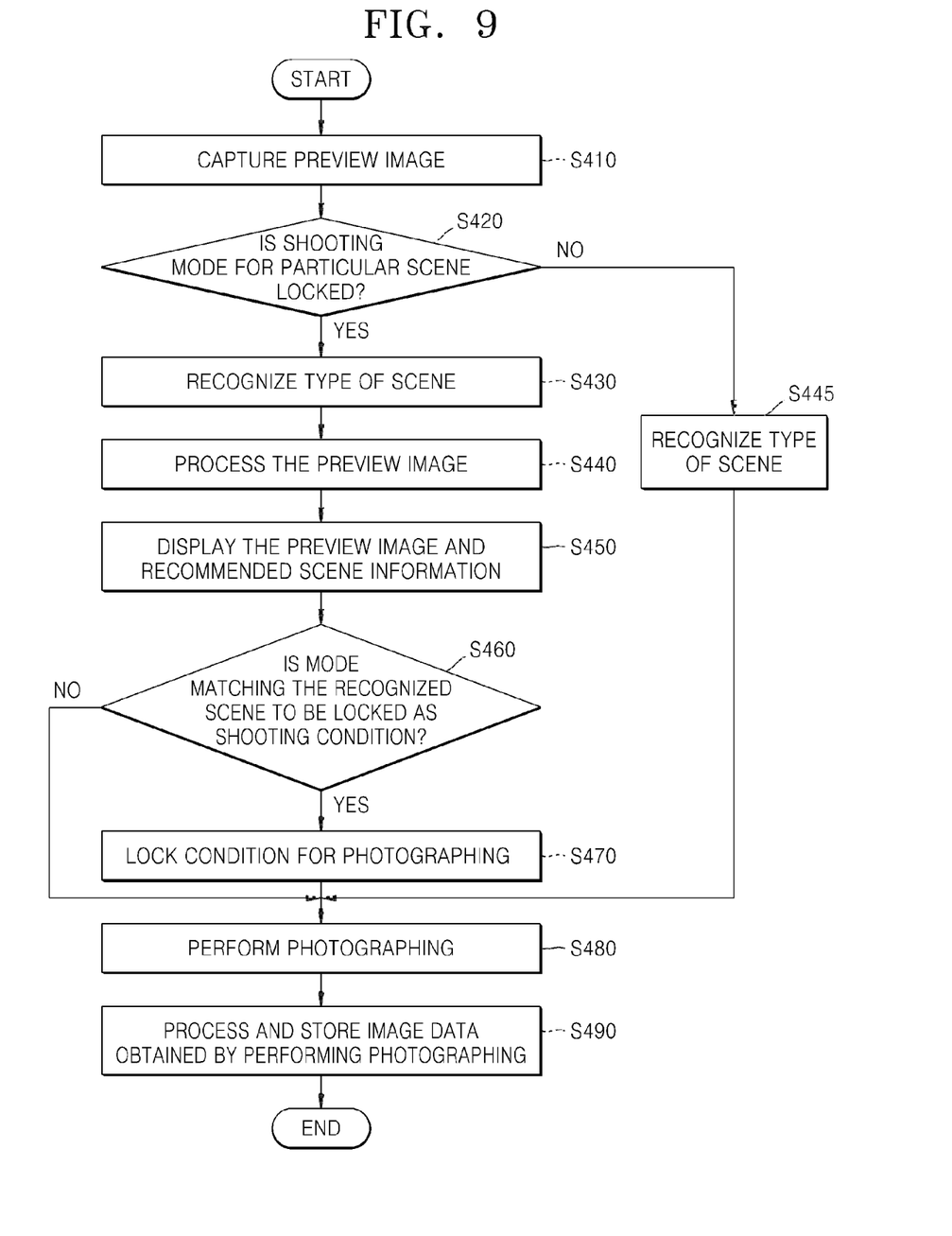
FIG. 9 is a flowchart illustrating a photographing method according to another embodiment.
Figure 10:
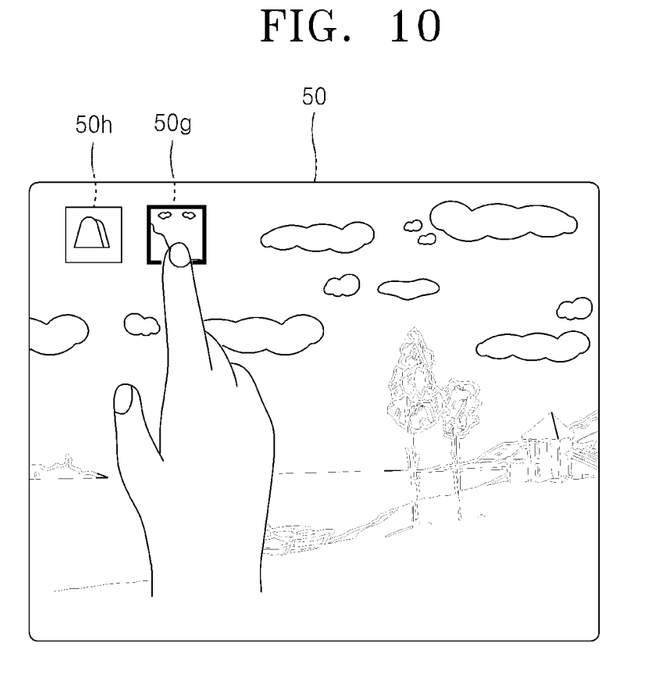
FIG. 10 is a diagram illustrating the photographing method of FIG. 9 according to an embodiment.

FIG. 9 is a flowchart illustrating a photographing method according to another embodiment. FIG. 10 is a diagram illustrating the photographing method of FIG. 9 according to an embodiment.

The photographing method of FIG. 9 includes recommending a shooting mode when a user locks a shooting condition that matches a shooting mode matching an automatically recognized scene.

Referring to FIG. 9, a preview image is captured by converting an electrical signal received from an imaging device into image data (operation S410). Next, it is determined whether a shooting mode for a particular scene is locked as the shooting condition (operation S420). If it is determined in operation S420 that the shooting mode for the particular scene is not locked, scene recognition is performed as described above with reference to FIG. 3, 7 or 8 (operation S445).

If it is determined in operation S420 that the shooting mode for the particular scene is locked, the type of a scene may be recognized by analyzing the image data of the preview image (operation S430). Next, the preview image may be processed according to the recognized type of the scene (operation S440), and the processed preview image and recommended scene information regarding the recognized type of the scene may be displayed (operation S450).

Referring to FIG. 10, when the preview image is displayed on a touch screen 50, a first icon 50h represents scene information regarding a 'landscape mode' that is a current shooting mode of the photographing apparatus, and a second icon 50g represents scene information regarding a 'sky mode' that are recommended scene information regarding the recognized type of the scene in operation S430 of FIG. 9. If a user selects the second icon 50g, a scene mode change occurs.

If it is determined that a scene mode change occurs (operation S460), a new shooting condition for performing photographing is set according to the changed scene mode (operation S470).

Thereafter, photographing is performed to obtain image data by operating the imaging device (operation S480). Then, the obtained image data is processed according to the locked shooting condition and is stored (operation S490).

In the photographing methods according to the above embodiments, even if a user locks a particular shooting mode as the shooting condition of a photographing apparatus, the type of a scene is automatically recognized and recommended scene information is displayed together with the scene. When the user selects the recommended scene information, the current shooting mode is replaced with a new shooting mode, thereby enabling the user to conveniently use automatic scene recognition.

As described above, a photographing apparatus and method according to an embodiment are capable of recognizing the type of a scene to be photographed and automatically setting a shooting condition that matches the recognized type of the scene. Also, a user may lock the matching shooting condition. Thus, it is possible to prevent the current shooting condition from being changed by a scene change while photographing is performed using automatic scene recognition. Also, although the current shooting condition is locked, a shooting mode that matches a change in the type of the scene may be recommended while photographing is performed according to the locked shooting condition. Therefore, the user may change the current shooting mode by selecting one of the recommended shooting modes.

Embodiments may include software modules which may be recorded and stored as program instructions or computer readable codes executable by a processor on non-transitory computer readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will be recognized that the terms "comprising," "including," and "having," as used herein, are specifically intended to be read as open-ended terms of art. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A photographing apparatus comprising:
an imaging device that converts light of an image into an electrical signal;
an image conversion unit that converts the electrical signal into image data;
a scene recognition unit that recognizes the type of a scene to be photographed by analyzing the image data;
a display unit that, responsive to the recognition of the type of the scene, presents a user interface to enable a user to selectively lock a shooting condition that corresponds to the recognized type of the scene;
a user input unit that enables the user to manipulate the user interface to indicate whether the shooting condition that corresponds to the recognized type of the scene should be locked or not; and
a condition setting unit that locks the shooting condition as a shooting mode corresponding to the recognized type of the scene for photographing such that the shooting condition is fixed even when a type of a scene of a subject to be photographed is changed from the recognized type of the scene, according to the user input received via the user input unit;
wherein the user input unit enables the user to manipulate the user interface to indicate that the shooting condition should be unlocked; and
the condition setting unit unlocks the shooting condition as a shooting mode according to the user input indicating that the shooting condition should be unlocked.

2. The photographing apparatus of claim 1, further comprising a shooting controller that controls the imaging device to capture the image according to the locked shooting condition.

3. The photographing apparatus of claim 2, further comprising an image processing unit that processes the image data generated by the image conversion unit according to the locked shooting condition and under control of the shooting controller.

4. The photographing apparatus of claim 3, further comprising a storage unit that stores the image data processed by the image processing unit.

5. The photographing apparatus of claim 1, wherein the display unit displays the user interface in the form of text, regardless whether the type of the scene of the subject to be photographed corresponds to the recognized type of the scene.

6. The photographing apparatus of claim 1, wherein the display unit displays the user interface in the form of an icon, regardless whether the type of the scene of the subject to be photographed corresponds to the recognized type of the scene.

7. The photographing apparatus of claim 1, wherein the display unit displays a preview image generated by the imaging device according to the locked shooting condition corresponding to the type of the scene recognized by the scene recognition unit.

8. The photographing apparatus of claim 1, further comprising a mode recommendation unit that, after the condition setting unit locks the shooting condition, displays a recommended mode that respectively matches the type of the scene recognized by the scene recognition unit on the display unit.

9. The photographing apparatus of claim 1, wherein the display unit comprises a touch screen, and the user input unit comprises a touch sensor.

10. The photographing apparatus of claim 1, wherein the user input unit comprises:
    a navigation button to select an element of the user interface; and
    a selection button to enter the selection.

11. A photographing method comprising:
    capturing a preview image by converting an electrical signal received from an imaging device into image data;
    recognizing the type of a scene to be photographed by analyzing the image data;
    automatically presenting on a display unit a user interface to enable a user to selectively lock a shooting condition that corresponds to the recognized type of the scene;
    locking the shooting condition, wherein the imaging device captures images according to the shooting condition, according to a user manipulation of the user interface; and
    performing photographing to obtain image data by operating the imaging device according to the locked shooting condition that is fixed even when a type of a scene of a subject to be photographed is changed from the recognized type of the scene;
    wherein the user interface enables the user to selectively unlock the shooting condition.

12. The photographing method of claim 11, further comprising processing the image data obtained by the performing of the photographing according to the locked shooting condition.

13. The photographing method of claim 12, wherein the displaying of the user interface comprises displaying the preview image and the user interface on the display unit, and further comprising processing the preview image according to the locked shooting condition.

14. The photographing method of claim 13, further comprising:
    displaying the user interface on the display unit during the performing photographing, regardless whether the type of the scene of the subject to be photographed corresponds to the recognized type of the scene.

* * * * *